United States Patent
Mefferd

(10) Patent No.: US 6,318,020 B1
(45) Date of Patent: Nov. 20, 2001

(54) THERMOCHROMIC FISHING LURE AND METHOD OF MAKING SAME

(76) Inventor: Larry Mefferd, 525 Allen St., Laurens, IA (US) 50554

( * ) Notice: Subject to any disclaimer, the term of this patent is extended or adjusted under 35 U.S.C. 154(b) by 0 days.

(21) Appl. No.: 09/361,105

(22) Filed: Jul. 26, 1999

(51) Int. Cl.[7] .................................................. A01K 85/00
(52) U.S. Cl. ............................................................. 43/42.32
(58) Field of Search .............................................. 43/42.32

(56) References Cited

U.S. PATENT DOCUMENTS 5,222,320 * 6/1993 Erickson ............................. 43/42.32
5,465,524 * 11/1995 Vallone ............................... 43/42.32
5,723,178 * 3/1998 Sheets ................................. 427/258

* cited by examiner

*Primary Examiner*—Kurt Rowan
(74) *Attorney, Agent, or Firm*—Zarley, McKee, Thomte, Voorhees & Sease

(57) ABSTRACT

An improved fishing lure is provided wherein the surface of the lure includes a multi-layered thermochromic surface. The thermochromic surface responds in different temperature ranges so that as the temperature changes, the surface displays a sequence of colors over a broad range of temperatures. The process for creating the purified thermochromic paint involves mixing thermochromic powder with clear oil and water in order to indicate undamaged thermochromic crystals for mixing with a clear lacquer so as to apply, in multiple layers, to the fishing lure and repeated for as many layers in as many colors as desired.

4 Claims, 1 Drawing Sheet

THERMOCHROMIC FISHING LURE AND METHOD OF MAKING SAME

BACKGROUND OF THE INVENTION

1. Field of the Invention

The invention relates to the field of fishing lures and, in particular, to lures that are responsive to varying temperatures resulting in colored lures whose color is temperature dependent, and the method of making the same.

2. Description of the Prior Art

In the art of fishing lures, it has been known to coat the outer surface of the lure with certain materials in order to attract fish. For example, some lures in the prior art are painted with luminous paint, pigment, or phosphorescent material so that the lures appearance would be attractive to certain fish.

In the 1970's, thermochromic materials were developed using encapsulated dyes. The technology was initially used in the textile and novelty industries. While color changing lures of various types have been provided in the prior art, fishing lures painted with thermochromatic paint are mentioned in U.S. Pat. No. 5,222,320 to Nels E. Erickson, the teachings of which are incorporated by this reference. However, these prior art thermochromatic lures only had the ability to change between two colors, and were not responsive to varying degrees of temperature often encountered in fishing, especially throughout the depths and seasons.

SUMMARY OF THE INVENTION

The present invention relates to a fishing lure that is coated with the plurality of thermochromic layers to produce a lure that changes colors responsive to temperature changes. Because there are a plurality of thermochromic layers, and because each layer obtains its color only in a specific temperature range, the present invention allowed the use of multiple layers with different temperature sensitivities to enable the use of varying colors over a broad range of temperatures.

In order to achieve a purity in the thermochromic layers not found when paints and inks are used, thermochromic powder is mixed with non-hazardous virgin clear oil and water. The process of mixing carries the clean undamaged crystals with the oil and the damaged or contaminated crystals with the water. A clean powder can be recovered from the oil and then mixed with clear lacquer to apply the layers of any color to a fishing lure of any design. The process may be repeated for as many layers as a person desires.

It is an object of the invention to provide a fishing lure that will change color upon reaching different temperatures.

Another object of the invention is to provide a process for the manufacture of a fishing lure which will change colors through a range of temperatures.

Yet another objective is to provide a process for making purified thermochromic paint which can display colors in a sequence corresponding to changing temperature ranges.

Still another objective of the invention is to provide a thermochromic lure that can be made easily and will be economical to manufacture.

Other objectives of the invention will become apparent to those skilled in the art once the invention has been shown and described.

DESCRIPTION OF THE PREFERRED EMBODIMENT

Figure 1:
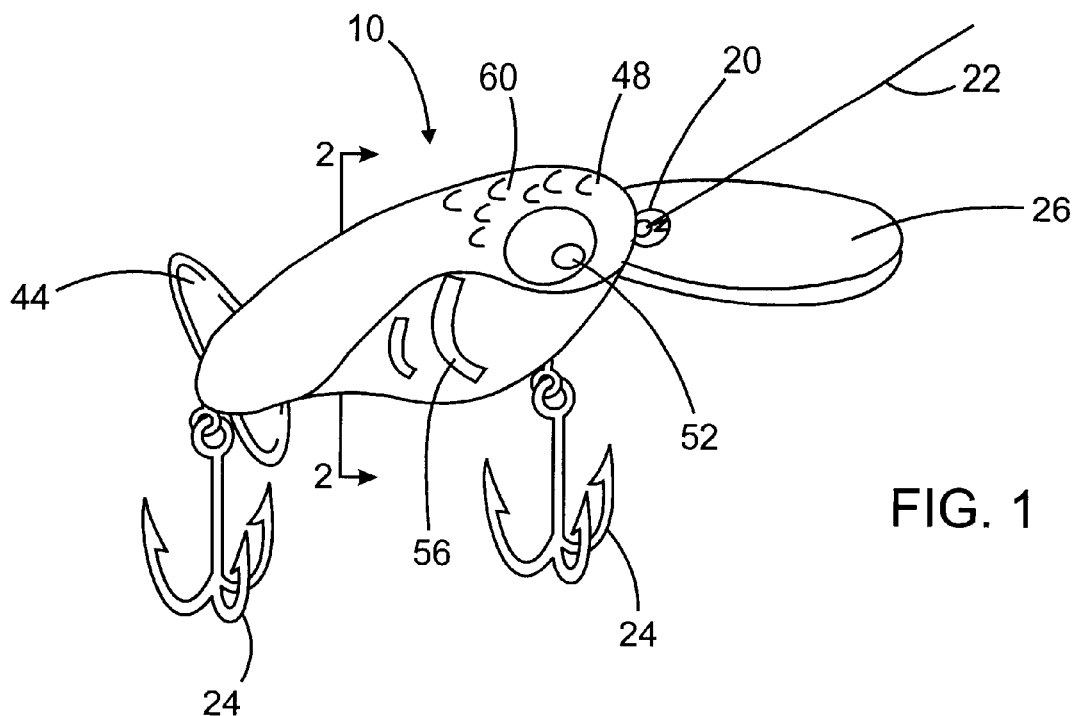
FIG. 1 is a perspective view of a fishing lure constructed in accordance with the invention.

FIG. 1 illustrates a fishing lure 10 which includes a body portion 14 which can come in a plurality of configurations and designs. The fishing lure 10 of FIG. 1 is in the general configuration and appearance of a bait fish. Preferably, the body 14 is molded of rigid plastic material or wood, which is provided with directional projections 16 if necessary for the action and operation of the lure. Other elements commonly found on fishing lures include an eyelet 20 for securing the flexible fishing line 22, and a set of three-prong hook elements 24.

Figure 2:
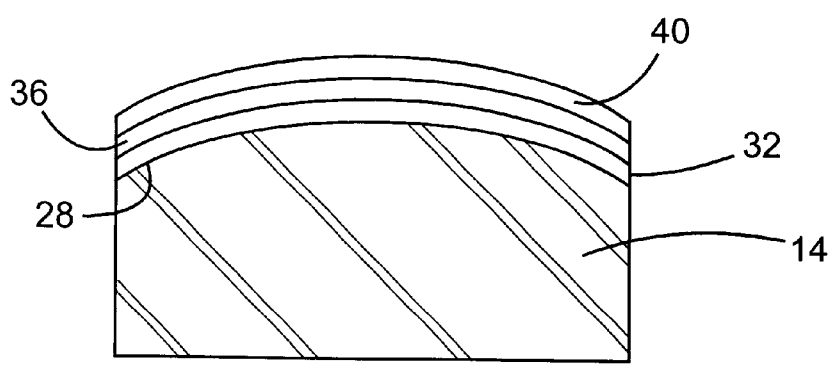
FIG. 2 is an enlarged fragmentary section taken along line 2—2 of FIG. 1.

In accordance with the present invention, the entire outer surface 28 of the lure body 14 is coated in a plurality of layers of thermochromic substance. FIG. 2 is a cutaway view showing the presence of a first layer 32 located immediately adjacent the surface 28 of the lure body 14, a second layer 36 and third layer 40 are also applied to the body 14 of lure 10. Although the preferred embodiment is shown having its entire body surface 28 covered with the thermochromic layers 32, 36, 40, depending on the design and proposed use of lure 10, the thermochromic layers may be applied over only portions of the body 14 thereby causing only portions to change colors.

In order to create the thermochromic layers 32, 36, 40, thermochromic powder is mixed with a clear liquid such as clear lacquers which allow multiple layers of color to be applied such that the fishing lure can change in a sequence of colors from approximately 32° F. (0° C.) to 140° F. (60° C.). Unfortunately, the process of producing ink or paint which is thermochromic induces contaminates and destroys some of the liquid crystals which make the layers appear opaque when they reach the temperature of change. Thus, when trying to use multiple layers, the second or third layer will not be revealed due to the top layer being opaque when it reaches its activation temperature instead of being transparent.

Therefore, by taking thermochromic powder in a selected color in operational temperature range, the thermochromic powder is mixed with a non-hazardous virgin clear oil (such as olive oil) and water. This process of mixing carries the clean undamaged crystals with the oil and the damaged contaminated crystals with the water. This allows a clean powder to be recovered from the oil by skimming the oil and this powder is then mixed with the clear lacquer to apply the first layer 32 of any color to a fishing lure of any design. This process is repeated for the second layer 36, the third layer 40, or as many layers as desired.

The thickness of each layer may depend greatly on the type of paint used, the purification procedure, and the color of paint selected. To determine the effectiveness of each layer, the lure may first be painted and then subjected to a range of temperature to see if the color completely covers the preceding layer. When all the thermochromic layers are transparent, the lure body, and any colorations and designs thereon, will be visible.

By way of example only, the lure 10 can be coated with the cleaned mixed orange powder to become transparent in a temperature range of 60° F. to 65° F. exposing a fuscia layer. Then, the fuscia layer becomes transparent in the range of 65° F. to 70° F. exposing a blue layer. The blue layer can be mixed so that it is colored blue until it becomes transparent when the temperature is in the operational range of 70° F. to 75° F. At that point, all three layers will be transparent, exposing the lure body surface. In this arrangement, the outer-most layer becomes transparent at the coldest selected temperature. Each subsequent layer has a higher activation temperature. While it is also possible to have a layer change from one color to another in a given temperature range, that will not expose the next subsequent layer, since it does not become transparent.

These ranges and variations can be repeated and applied over the top of any other color, and colors can be reused. Further, layers can be created having multiple tones so that, for example, the tail 44 of the lure could be one color while the head 48 of the lure could be another at a specific temperature range. Additionally, other design elements can be painted or added to the lure such as eyes 52, gills 56 and scales 60. However, it may be necessary to paint each design on each layer, as the subsequent layer will cover the design when the subsequent layer is not transparent.

As a result, it can be seen that the present invention has the capability of using multiple tones at the same operating temperature as well as the use of dark or light colors at any level in the multiple layers under certain operating temperatures. Therefore, a person can use one lure for a complete temperature range inhabited by select game fish. While the forms of fishing lures herein describe constitute preferred embodiments of the invention, it is to be understood that the invention is not limited to those precise forms of fishing lures, and that changes may be made therein without departing from the scope and spirit of the invention as defined in the appended claims.

What is claimed is:

1. A fishing lure comprising:
    a lure body having an outer body surface colored a body color;
    a first thermochromic layer covering at least a portion of said outer body surface of said lure body, said first thermochromic layer having a first opaque color which blocks out said portion of said outer body surface when exposed to a temperature below a first activation temperature, and which becomes transparent to expose said body color when exposed to a temperature above said first activation temperature;
    a second thermochromic layer covering at least a portion of said first thermochromic layer, said second thermochromic layer having an opaque second color which blocks out said portion of said first thermochromic layer when exposed to a temperature below a second activation temperature, and which becomes transparent to expose said first opaque color when exposed to a temperature above said second activation temperature;
    said first and second activation temperatures being different from one another;
    said first and second thermochromic layers each being comprised of substantially undamaged thermochromic crystals mixed with a clear lacquer whereby said substantially undamaged thermochromic crystals are formed by mixing a thermochromic powder comprising damaged and undamaged thermochromic crystals with oil and water and recovering said undamaged thermochromic crystals from said oil.

2. A fishing lure according to claim 1 wherein said first activation temperature is higher than said second activation temperature whereby said second thermochromic layer will become transparent at a higher temperature than said first thermochromic layer.

3. A fishing lure according to claim 2 and further comprising a third thermochromic layer covering at least a portion of said second thermochromic layer, said third thermochromic layer having an opaque third color which blocks out said portion of said second thermochromic layer when exposed to a temperature below a third activation temperature and which becomes transparent to expose said second thermochromic layer when exposed to a temperature above said third activation temperature.

4. A fishing lure according to claim 3 wherein said third activation temperature is below said first and second activation temperatures.

\* \* \* \* \*